United States Patent [19]
Fagan et al.

[11] 3,716,208
[45] Feb. 13, 1973

[54] ENERGY ABSORBING LANDING GEAR

[75] Inventors: Castle H. Fagan, Irving; Robert R. Lynn, Arlington, both of Tex.

[73] Assignee: Textron, Inc.

[22] Filed: June 11, 1970

[21] Appl. No.: 45,363

[52] U.S. Cl............244/108, 280/124 B, 280/124 F
[51] Int. Cl..............................................B64c 25/52
[58] Field of Search......244/108, 107, 104, 103, 102, 244/100, 17.17, 100 R, 17.11; 188/1C; 267/22, 57; 280/124 B, 124 F

[56] References Cited

UNITED STATES PATENTS

| | | | |
|---|---|---|---|
| 1,891,188 | 12/1932 | Stalb, Jr. | 244/108 |
| 2,223,834 | 12/1940 | Seltenreich et al. | 244/108 |
| 2,641,423 | 6/1953 | Harriman et al. | 244/100 R |
| 3,173,632 | 3/1965 | Woods | 244/17.17 X |
| 892,064 | 12/1932 | Markey | 244/108 |
| 2,296,017 | 9/1942 | Bound et al. | 244/104 |
| 2,973,168 | 2/1961 | Hartel | 244/104 |

*Primary Examiner*—Milton Buchler
*Assistant Examiner*—Paul E. Sauberer
*Attorney*—Richards, Harris & Hubbard

[57] ABSTRACT

A landing gear for helicopters in which a member having a static spring rate and plastic yielding characteristics is mounted in series with a member having a static spring rate and a velocity-sensitive restraining force. The combination serves to provide for appropriately "soft" landings under conditions of light gross weight and/or low vertical descent speed, and is also capable of absorbing the forces generated during "hard" or crash landings under conditions of heavy gross weight and/or high vertical descent speed. By designing the yield point of the plastic yielding member to a force approximately equal to the resistance offered by the velocity-sensitive unit at the time that is "bottoms out," the efficient energy absorbing properties of the plastically yielding member are employed to extend the energy absorbing capabilities of the gear.

15 Claims, 6 Drawing Figures

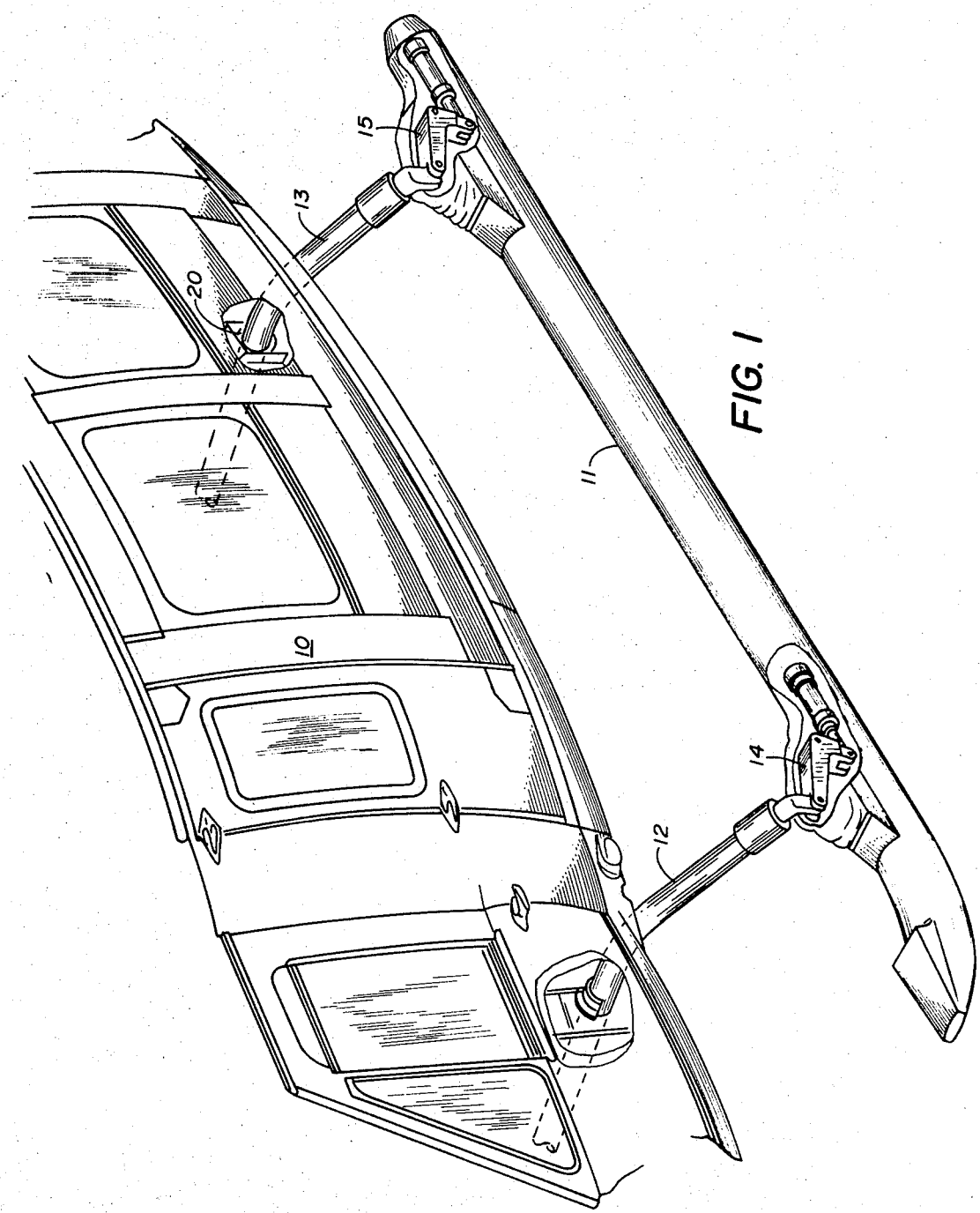

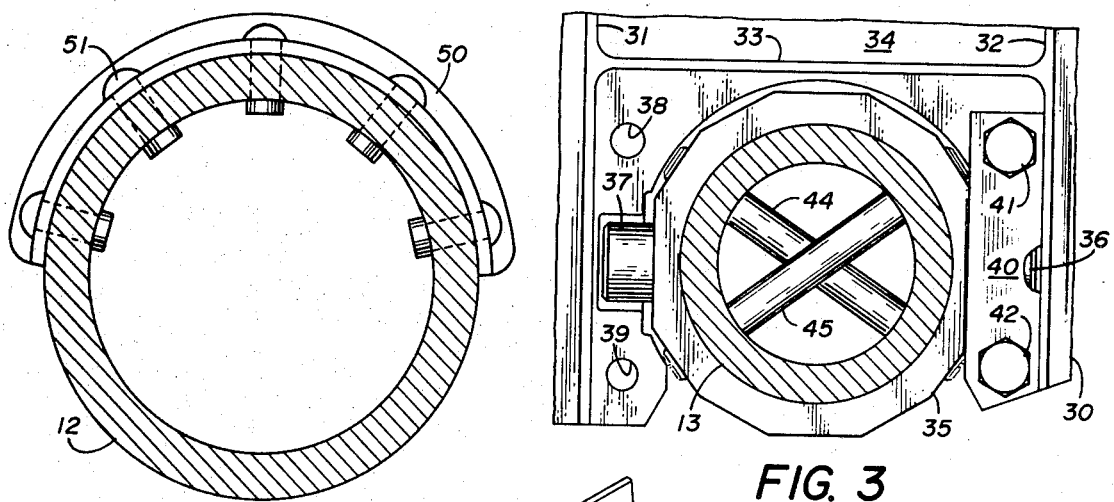
FIG. 4
FIG. 3
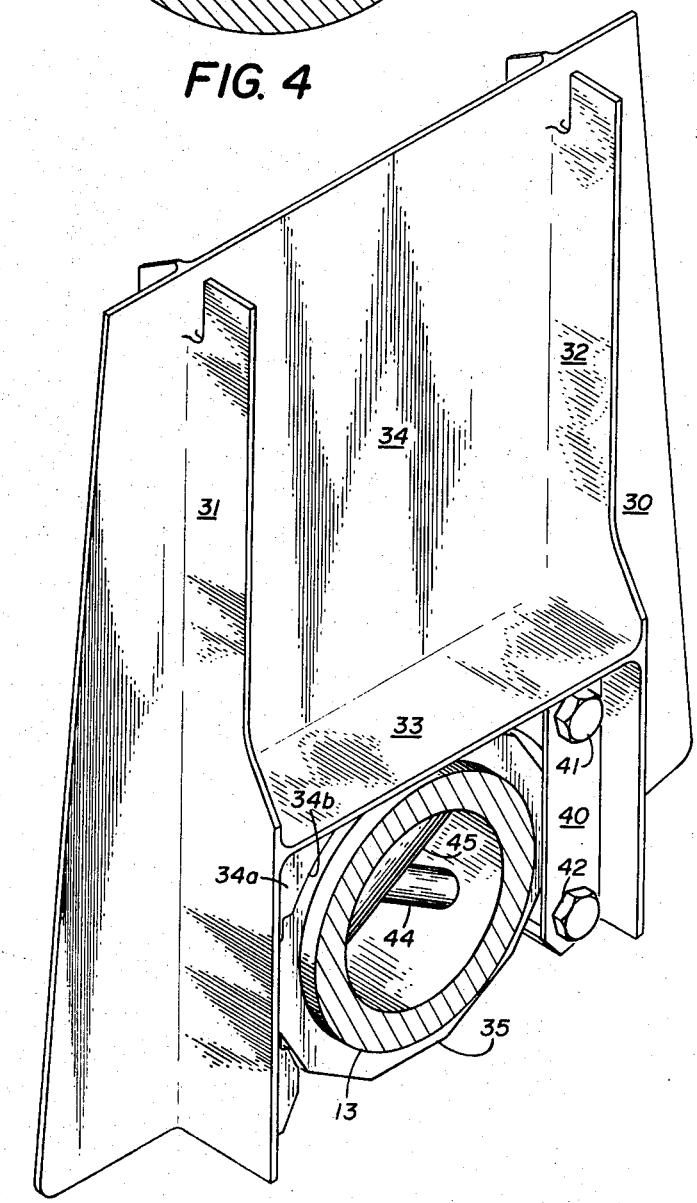
FIG. 2
INVENTORS:
CASTLE H. FAGAN
ROBERT R. LYNN
Richards, Harris + Hubbard
ATTORNEYS

ENERGY ABSORBING LANDING GEAR

BACKGROUND OF THE INVENTION

Skid type helicopter landing gears, such as that set forth in U. S. Pat. No. 2,641,423, perform their function of energy storing and absorption through the deflection of a member that has a static spring rate, i.e., the load development is proportional to the deflection of the member which is designed to retain its normal shape under the loads produced by crash or hard landings. Under normal loads, where the member will bend but will not plastically deform, the energy is stored in the member by its deflection (a small portion of it being dissipated by heat produced in the bending process) and is then fed back into the aircraft, often resulting in a bouncing type of landing. Under hard or crash landing conditions, the energy is dissipated, rather than stored, through the permanent plastic deformation of the member. In order to provide a landing gear of this type that can accommodate hard or crash landings without damage to the aircraft structure, this member must be capable of absorbing a large amount of energy and thus will be hard or "stiff," a quality that makes for a very rigid structure in the context of an ordinary landing and consequently fails to provide a comfortable gear for the ordinary landing. One way of appreciating the problem is to assume two landings of the same helicopter at the same rate of descent, one landing with the aircraft at a high gross weight and the other landing with the aircraft at a low gross weight. In the case of the high gross weight landing, in order to absorb or store the energy, the gear must be of a certain stiffness and must deflect a certain amount. The force required to deflect the member per unit of deflection multiplied by the units deflected equals the energy present in the descending aircraft that must be absorbed by the gear. Assuming that the gear is designed to accommodate the condition of the high gross weight landing, it can be appreciated that the gear will offer an uncomfortable, "bouncy" feel to the pilot and occupants of the aircraft under low gross weight landing conditions. For example, if the low gross weight of the aircraft is 65 percent of the high gross weight, then in order to absorb the energy of descent during the low gross weight landing the gear will deflect about 65 percent of that which it would have deflected at the high gross weight. This means that the pilot and occupants will be decelerated over only 65 percent of the distance and they will undergo higher, and uncomfortable, $g$ landings. To the pilot and occupants, the experience will be that of a rough landing. Considering the wide extremes of weights and landing speeds that one wishes to accommodate in the same helicopter, it should be clear that the conventional skid gear cannot be readily adapted to perform suitable function for all conditions of loading and/or operation of the modern helicopter.

Oleo struts, liquid spring gears and the like do not plastically yield, but operate with static spring rates and velocity-sensitive restraining forces. By virtue of the velocity-sensitive restraining force characteristic, the harder the landing the more energy absorbing capability the unit has, and a landing gear of this type can more readily be designed to accommodate a wider range of aircraft gross weights than can the previously noted type.

However, while the energy absorbing capability of the liquid spring gear and the oleo strut type of landing gear is proportional to the landing (vertical) velocity and thus is adaptable to a wider range of gross weights than the conventional skid gear, its ultimate energy absorbing capability, considering only a crash landing, may not be as great as the energy absorbing capability inherent in the skid landing gear noted in the aforenoted U. S. Pat. No. 2,641,423 in which, in the event of a crash, the cross tubes will permanently yield and rupture. Yielding and rupture of metal is a more efficient method of energy absporption than dissipation of energy through heat transmission as takes place in the oleo strut and liquid spring.

It should be appreciated that in the event of landings that may be classified as "crash" landings, the primary concern is that of preservation of life and limb, rather than that of "comfort" and it is therefore of the utmost importance that the energy absorbing characteristics of the gear be as efficient as possible under a crash landing, absorbing the greatest amount of energy as quickly as possible.

The present invention serves the purpose of providing a landing gear that has comfortable "soft" and "moderate" landing characteristics while extending energy absorption capability and efficiency under "crash" landings, and it achieves this by mounting in series a member with static spring rate and plastic yielding characteristics with a member that has a static spring force and offers a velocity-sensitive restraining force.

DESCRIPTION OF THE DRAWINGS

For a more complete understanding of the present invention and for further objects and advantages thereof, reference may now be had to the following description taken in conjunction with the accompanying drawings in which:

FIG. 1 is a fragmentary view of one side of a helicopter showing one landing skid mounted in accordance with the present invention;

FIG. 2 is a detailed showing of the flange used for coupling the aft cross tube to the fuselage;

FIG. 3 is a side view of the aft cross tube mounting showing the tube in section;

FIG. 4 illustrates the forward cross tube mounting;

DETAILED DESCRIPTION

Figure 5:
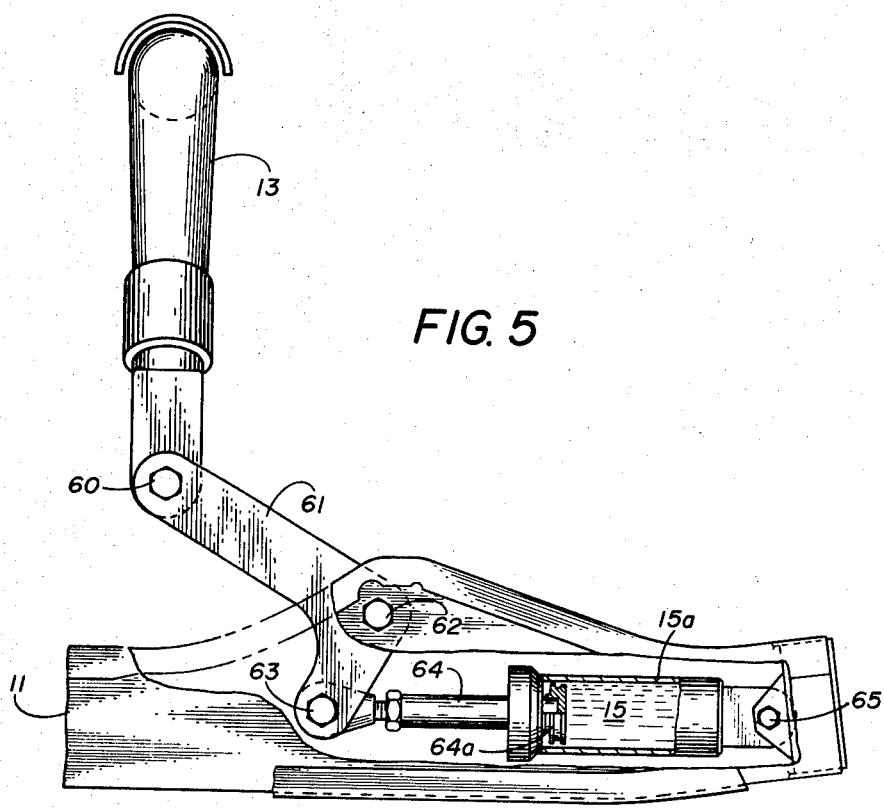
FIG. 5 is a side view partially in section showing the coupling between the cross tubes and the skids by way of liquid spring shocks.

In FIG. 1, the left side landing gear for a helicopter 10 has been illustrated. A skid 11 of conventional type is employed to provide the ground contact for the landing gear. The skid 11 is coupled to the fuselage by way of a forward cross tube 12 and a rear cross tube 13. The forward cross tube 12 pivots whereas the rear cross tube 13 is fixed as will hereinafter be further detailed with both cross tubes coupled to the skid 11 by way of liquid spring shocks. By liquid spring shock there is meant a liquid filled hydraulic cylinder unit with an internal bypass therein from one side of the piston to the other.

As shown, the end of the forward cross tube 12 is connected to the skid 11 by way of a liquid spring shock unit 14 whereas the aft cross tube 13 is connected to the rear of the skid 11 by way of a liquid spring shock unit 15. Of course, a similar skid is supported on the right side of the helicopter 10 by similar cross tubes, liquid spring shock units, etc.

FIGS. 2 and 3 illustrate one form in which the aft cross tube is locked into a coupling 20. FIG. 2 is an isometric view partially in section to show the aft cross tube extending through a mounting trunnion. More particularly, the fuselage is provided with a bracket 30 which is provided with vertical webs 31 and 32 and a horizontal web 33. A thin vertical panel 34 extends between webs 31, 32 and 33. a thick vertical panel 34a extends between webs 31 and 32 below the web 33 and is provided with a generally circular opening 34b in which a trunion 35 is received.

Trunion 35, FIG. 3, has a pair of trunion lugs 36 and 37 which fit into nests in the web 34a. On the left side of FIG. 3 a pair of holes 38 and 39 are provided for clamping retaining straps which retain the lug 37 in the web 34a. On the right hand side, the strap 40 is shown in place being secured by bolts 41 and 42.

The aft cross tube 13 is shown in section secured to the trunion 35 by means of two cross pins 44 and 45. The pin 44 extends through the trunnion 35 and also pin 45 extends through inboard of pin 44. The pins 44 and 45 key the cross tube 13 to the trunnion 35 to prevent rotation thereof. The trunion lugs 36 and 37 couple the trunion to the bracket 30 so that the cross tube 13 is prevented from rotation relative to the fuselage. A small gap is provided between the lugs and the retaining straps such as would be between lug 36 and strap 40. The gap allows lateral motion of lugs 36 and 37 during deflection.

In contrast, FIG. 4 illustrates the mounting for the forward cross tube 12. A pad 50 is secured by rivets 51 to the tube 12. The pad 50 is provided with exterior arcuate rib sections which maintain the longitudinal position of the cross tube 12 relative to the fuselage but permits rotation about a horizontal axis. The fuselage carries a bearing plate to mate with pad 50 to transfer weight of the aircraft onto the forward cross tube.

FIG. 5 illustrates the coupling used for mounting the liquid spring shocks between the ends of each of the forward and aft cross tubes and the skid. The aft cross tube 13 is shown coupled at its extremity through a pivot 60 to a crank 61. The crank 61 is mounted on skid 11 by a pivot 62 and is pivotally coupled to the end 63 of a piston rod 64 and piston 64a which works in and is part of a liquid spring shock cylinder 15a for shock 15. Cylinder 15a is mounted at pivot 65 near the rear end of the skid 11.

The liquid spring shocks of the type manufactured and sold by Taylor Devices, North Tonawanda, N.Y., have been found to be satisfactory. Such units are those which in one embodiment of the invention provided a 3.5 inch liquid spring stroke for an 8 inch travel of the pivot pin 60. The actuation of this device resulted in a static spring force and a velocity spring force being applied to the cross tube 13. The return stroke of the unit acts as a damper which dissipates the stored energy and prevents excessive rebound. The fluid used in the above units was of the type manufactured by Dow Corning and identified as Dow Corning 200. Such fluid is available in viscosities from 0.65 to 60,000 centistokes. It was preferred that, for use with a helicopter of the type manufactured and sold by Bell Helicopter Company, Fort Worth, Tex., and identified as 205A Helicopter, the viscosities were 1,000 and 350 centistrokes for the aft and forward shocks, respectively. The use of such liquid spring shocks with such fluid provided an optimum characteristics for the above aircraft; however, it is noted that other tuned energy absorbing devices which have both a static and velocity spring force capability could be used.

Figure 6:
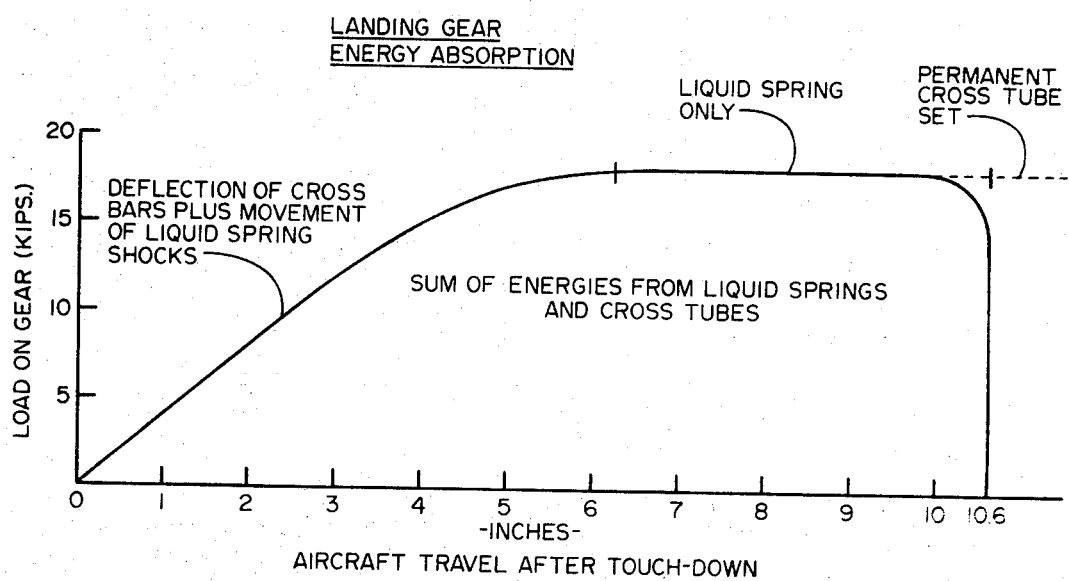
FIG. 6 is an energy absorption diagram for the landing gear of the present invention.

As shown in FIG. 6, the landing gear energy absorption for a particular landing is plotted, the curve representing the sum of energies absorbed by the liquid springs and cross tubes. It will be noted that in the region from zero inches travel (travel meaning vertical travel of the aircraft after touchdown through deflection or movement of the gear) to about 6.25 inches travel, the deflection of the cross beams and the movement of the liquid spring shocks combine to give a substantially constant load-deflection characteristic. For lower gross weights or lower velocity sink characteristics the slope of this line would be lesser since the velocity spring rate of the liquid spring shock would then be lower. After about 6.25 inches of travel, the energy is absorbed only in the liquid spring which, through a proper relationship between the velocity spring rate and the static spring rate of the springs, is designed to then maintain a relatively constant force until it bottoms out. The liquid spring was designed to bottom out shortly after about 10.6 inches of travel, at which time the cross tube begins to deform plastically and act to further absorb the energy of the "crash" in a highly efficient manner. As shown by the dotted line, the load continues substantially constant through the plastic deformation of the cross tubes.

Provided that the landing is not so severe that the fuselage strikes the ground, the type of gear as presented tends to make the landing relatively "soft" because the load is maintained substantially constant. Also, as previously stated, a large amount of energy is absorbed by the type of gear herein presented, through the combining of characteristics of the cross tubes with those of the liquid spring shocks.

Thus, by combining certain characteristics of the cross tubes with certain characteristics of the liquid spring shocks, a desirable energy absorption function is built into the landing gear and prevents unduly hard landings and protects the landing gear in all normal operations as well as in abnormal operations. As has been stated, forces involved in the landing are minimized by providing protection for the cross tubes through the use of the spring shocks up to the point that the spring shocks have been deflected through their entire range. Thereafter, the permanent set taken in the cross tubes at load levels which the personnel and the aircraft involved can withstand.

It will be understood that a static spring force is created by forcing the piston rod 64 into the cylinder 15a. This reduces the volume and compresses the liquid. Thus, the static spring force is a function of the preload pressure and the piston rod position. This spring constant can be changed with the change in piston rod diameter and/or by using a fluid with higher compression spring rate. Also, a preload pressure change can be used to change the initial static spring force resulting in a change in the amount of static energy stored. The velocity spring force, on the other hand, due to the use of the liquid spring shock is a result of the resistance created as the fluid is forced past the piston end 64a at a high rate. Thus, the greater the piston velocity, the higher the force. As above noted, because the fluid must also flow past the piston on the return stroke, the unit acts as a damper and dissipates the stored energy. The velocity spring characteristics can be changed by modifying the unit 15 to change the cylinder to piston clearance or by using the fluid that has a different viscosity. Therefore, a wide range of energy absorption characteristics can be achieved by the minor changes after the unit is fabricated.

It has been found that the efficiency of the device can be approximately 90 percent. Efficiency is defined as the energy absorbed in inch pounds divided by the sum of the maximum load (in pounds) times the distance traveled (in inches). However, the system operating at approximately 80 percent efficiency was found to be an optimum level for good landing characteristics throughout the gross weight range of the aircraft. In the drawings shown in FIG. 6, the aircraft travel after touchdown was 10.6 inches. However, the unit illustrated actually will allow 12 inches of travel of the center of gravity. The efficiency of the landing gear is approximately 70 percent for a 9,000 pound gross weight vehicle and a sink speed of about 8 feet per second. Higher values will be obtained with a higher gross weight aircraft and/or higher sink speeds.

Although a specific embodiment of the invention is illustrated in the drawings and described herein, it will be understood that the invention is not limited to the embodiment disclosed but is capable of rearrangement, modification and substitution of parts and elements without departing from the spirit of the invention.

What is claimed is:

1. An energy absorbing landing gear for an aircraft comprising:
    a landing skid;
    an elongated tubular spring member with one end connected to the aircraft;
    crank means with one end rotatably attached to said landing skid and the other end of the crank means rotatably attached to the other end of said tubular spring; and
    a liquid spring with one end rotatably connected to said crank and the other end rotatably connected to said skid.

2. An energy absorbing landing gear as defined in claim 1 wherein:
    said tubular spring member deflects upon the application of normal loads and deforms plastically upon the application of excessive loads; and
    said liquid spring member provides velocity sensitive resistance to the application of loads.

3. An energy absorbing landing gear for an aircraft comprising:
    a landing skid;
    an elongated tubular spring member with one end connected to the aircraft;
    crank means rotatably attached to the other end of said tubular spring; and
    a liquid spring with one end rotatably connected to said crank and the other end rotatably connected to said skid, said crank means being rotatably connected to said skid at a point on said crank between the points said tubular and liquid springs connect to said crank.

4. An energy absorbing landing gear as defined in claim 3 wherein:
    said tubular spring member deflects upon the application of normal loads and deforms plastically upon the application of excessive loads; and
    said liquid spring member provides velocity sensitive resistance to the application of loads.

5. An energy absorbing landing gear for an aircraft comprising:
    a landing skid;
    a pair of tubular springs with one end connected to the aircraft;
    a pair of crank means with a first end of each crank means rotatably attached to one of each of the other ends of said tubular springs and a second end of each crank means rotatably attached to said landing skid; and
    a pair of liquid springs each with one end rotatably connected to one of said cranks and the other end rotatably connected to said skid.

6. The energy absorbing landing gear according to claim 5 wherein the liquid springs bottom upon the application of a predetermined load between the landing skid and the aircraft and wherein the tubular springs begin to collapse in plastic deformation upon the application of substantially the same predetermined load.

7. An energy absorbing landing gear for an aircraft comprising:
    a landing skid;
    a pair of tubular springs with one end connected to the aircraft;
    a pair of crank means with a first end of each of said crank means rotatably attached to one of each of the other ends of said tubular springs and a second end of each crank means rotatably attached to said landing skid;
    a pair of liquid springs each with one end rotatably connected to one of said cranks and the other end rotatably connected to said skid, said crank means being connected to said skids at a point on said crank between the points said tubular and liquid springs connect to said crank.

8. The energy absorbing landing gear according to claim 7 wherein the liquid springs bottom upon the application of a predetermined load between the landing skid and the aircraft and wherein the tubular springs begin to collapse in plastic deformation upon the application of substantially the same predetermined load.

9. An energy absorbing landing gear for an aircraft as defined in claim 7 wherein:
    said tubular and liquid springs are adapted whereby said springs are cooperable in a first low load range to linearly deflect with load, said springs operable in a second higher load range wherein said first spring is fully deflected whereby said second liquid spring absorbs substantially all energy, and operable at a third highest load range beyond the range of said liquid spring wherein said first spring plastically deforms to absorb energy.

10. An energy absorbing landing gear for an aircraft as defined in claim 7 wherein:
  said pair of tubular springs are located at forward and rear positions of the aircraft with said forward tubular spring being mounted for rotation relative to the aircraft and said rear tubular spring is fixed relative to the aircraft.

11. The energy absorbing landing gear according to claim 1 wherein the movement of the liquid spring member is limited by a stop, wherein the liquid spring member engages the stop upon the application of a predetermined load, and wherein the tubular spring member begins to plastically deform upon the application of substantially the same predetermined load.

12. The energy absorbing landing gear according to claim 1 wherein the tubular spring member is connected to one point on said crank and wherein the liquid spring member is connected to another point on said crank.

13. The energy absorbing landing gear according to claim 1 wherein the liquid spring shock functions both as a load dependent spring and as a viscous damper.

14. An energy absorbing landing gear for an aircraft as defined in claim 5 wherein:
  said tubular and liquid springs are adapted whereby said springs are cooperable in a first low load range to linearly deflect with load, said springs operable in a second higher load range wherein said first spring is fully deflected whereby said second liquid spring absorbs substantially all energy, and operable at a third highest load range beyond the range of said liquid spring wherein said first spring plastically deforms to absorb energy.

15. An energy absorbing landing gear for an aircraft as defined in claim 5 wherein:
  said pair of tubular springs are located at forward and rear positions of the aircraft with said forward tubular spring being mounted for rotation relative to the aircraft and said rear tubular spring is fixed relative to the aircraft.

* * * * *